(12) United States Patent
Bunker, II

(10) Patent No.: US 12,344,490 B2
(45) Date of Patent: Jul. 1, 2025

(54) RAMP COMPONENT SYSTEM

(71) Applicant: Owen Woodruff Bunker, II, Denver, CO (US)

(72) Inventor: Owen Woodruff Bunker, II, Denver, CO (US)

( * ) Notice: Subject to any disclaimer, the term of this patent is extended or adjusted under 35 U.S.C. 154(b) by 0 days.

(21) Appl. No.: 17/939,342

(22) Filed: Sep. 7, 2022

(65) Prior Publication Data

US 2023/0183027 A1 Jun. 15, 2023

Related U.S. Application Data

(63) Continuation of application No. 16/549,796, filed on Aug. 23, 2019, now Pat. No. 11,440,754, which is a
(Continued)

(51) Int. Cl.
*B65G 69/30* (2006.01)
*E01D 15/12* (2006.01)
(Continued)

(52) U.S. Cl.
CPC ............ *B65G 69/30* (2013.01); *E04F 11/002* (2013.01); *F16B 45/00* (2013.01); *E01D 15/12* (2013.01);
(Continued)

(58) Field of Classification Search
CPC ... E04F 11/002; E04F 2011/007; F16B 45/00; B65G 69/30; E01D 15/12
See application file for complete search history.

(56) References Cited

U.S. PATENT DOCUMENTS 1,360,082 A  11/1920  Bort
1,587,348 A   6/1926  Myers
(Continued)

FOREIGN PATENT DOCUMENTS

EP  2502609 A1  9/2012
FR  1485160 A   6/1967
FR  1485161 A   6/1967

OTHER PUBLICATIONS

U.S. Appl. No. 14/153,787, Final Office Action, Mailed On Dec. 23, 2016, 8 Pages.
(Continued)

*Primary Examiner* — Abigail A Risic
(74) *Attorney, Agent, or Firm* — Kilpatrick Townsend & Stockton LLP

(57) ABSTRACT

A ramp system is disclosed which may include first and second components. The first component may include horizontal and vertical portions, and a hook. The horizontal portion may be supported by a lip of a structure, and may have a width equivalent to a length of the lip. The vertical portion may be coupled with, and hang downward from, the horizontal portion, and may have the same width as the horizontal portion. The hook may be coupled with the vertical portion, and may have the same width as the horizontal portion. The second component may include a protrusion and channel. The protrusion may have a width equal or less than the width of the horizontal portion, and be supported by the hook. The channel may be coupled with the protrusion, and have the same width. The channel may receive a planar component which forms a sloped surface of a ramp.

20 Claims, 10 Drawing Sheets

Related U.S. Application Data continuation of application No. 14/153,787, filed on Jan. 13, 2014, now abandoned.

(60) Provisional application No. 61/751,362, filed on Jan. 11, 2013.

(51) Int. Cl.
  *E04F 11/00* (2006.01)
  *F16B 45/00* (2006.01)

(52) U.S. Cl.
  CPC ... *E04F 2011/005* (2013.01); *E04F 2011/007* (2013.01)

(56) References Cited

U.S. PATENT DOCUMENTS

| | | |
|---|---|---|
| 2,559,712 A | 7/1951 | Dobbs |
| 3,001,752 A | 9/1961 | Loy |
| 3,423,780 A | 1/1969 | Alten |
| 3,510,015 A | 5/1970 | Roshaven |
| 3,984,891 A | 10/1976 | Weinmann |
| 4,528,711 A | 7/1985 | Packer |
| 4,853,999 A | 8/1989 | Smith |
| 5,325,558 A | 7/1994 | Labreche |
| 5,347,672 A | 9/1994 | Everard et al. |
| 5,446,937 A * | 9/1995 | Haskins ............... B65G 69/287 254/88 |
| 5,553,762 A | 9/1996 | Brown |
| 5,815,871 A | 10/1998 | Borchardt |
| 6,009,587 A | 1/2000 | Beeman |
| 6,364,260 B1 | 4/2002 | Lorincz et al. |
| 6,389,629 B1 | 5/2002 | Schouest |
| 6,575,516 B2 | 6/2003 | Webber |
| 6,887,028 B1 | 5/2005 | Kirla, Jr. |
| 7,179,042 B1 | 2/2007 | Hartmann et al. |
| 7,207,088 B2 | 4/2007 | Adams et al. |
| 7,299,517 B1 | 11/2007 | Adinolfe |
| 7,310,843 B1 | 12/2007 | Mitchell |
| 7,344,184 B2 | 3/2008 | Salvador et al. |
| 7,930,788 B1 | 4/2011 | Beilstein |
| 7,992,833 B1 | 8/2011 | Goodman et al. |
| 8,397,329 B2 | 3/2013 | Just et al. |
| 8,914,932 B2 | 12/2014 | Romanak et al. |
| 9,878,675 B2 | 1/2018 | George et al. |
| 10,351,039 B2 | 7/2019 | Shaffer et al. |
| 11,440,754 B2 | 9/2022 | Bunker, II |
| 2003/0066938 A1 | 4/2003 | Zimmerman |
| 2006/0156492 A1 | 7/2006 | Warford |
| 2010/0223740 A1 | 9/2010 | Pratt et al. |
| 2013/0037678 A1 | 2/2013 | Liu |
| 2013/0091639 A1 | 4/2013 | Romanak et al. |
| 2014/0196225 A1 | 7/2014 | Bunker, II |
| 2014/0265403 A1 | 9/2014 | Farber |
| 2019/0107248 A1 | 4/2019 | Hendricks |

OTHER PUBLICATIONS

U.S. Appl. No. 14/153,787 , Final Office Action, Mailed On Sep. 2, 2015, 8 pages.
U.S. Appl. No. 14/153,787 , Final Office Action, Mailed On May 31, 2018, 9 pages.
U.S. Appl. No. 14/153,787 , Non-Final Office Action, Mailed On Sep. 8, 2017, 10 pages.
U.S. Appl. No. 14/153,787 , Non-Final Office Action, Mailed On Feb. 26, 2019, 11 pages.
U.S. Appl. No. 14/153,787 , Non-Final Office Action, Mailed On Jan. 22, 2015, 8 pages.
U.S. Appl. No. 14/153,787 , Non-Final Office Action, Mailed On May 4, 2016, 8 pages.
U.S. Appl. No. 16/549,796 , Non-Final Office Action, Mailed On Aug. 20, 2021, 13 pages.
U.S. Appl. No. 16/549,796 , "Notice of Allowability", Jul. 14, 2022, 5 pages.
U.S. Appl. No. 16/549,796 , Notice of Allowance, Mailed On Jun. 23, 2022, 8 pages.

* cited by examiner

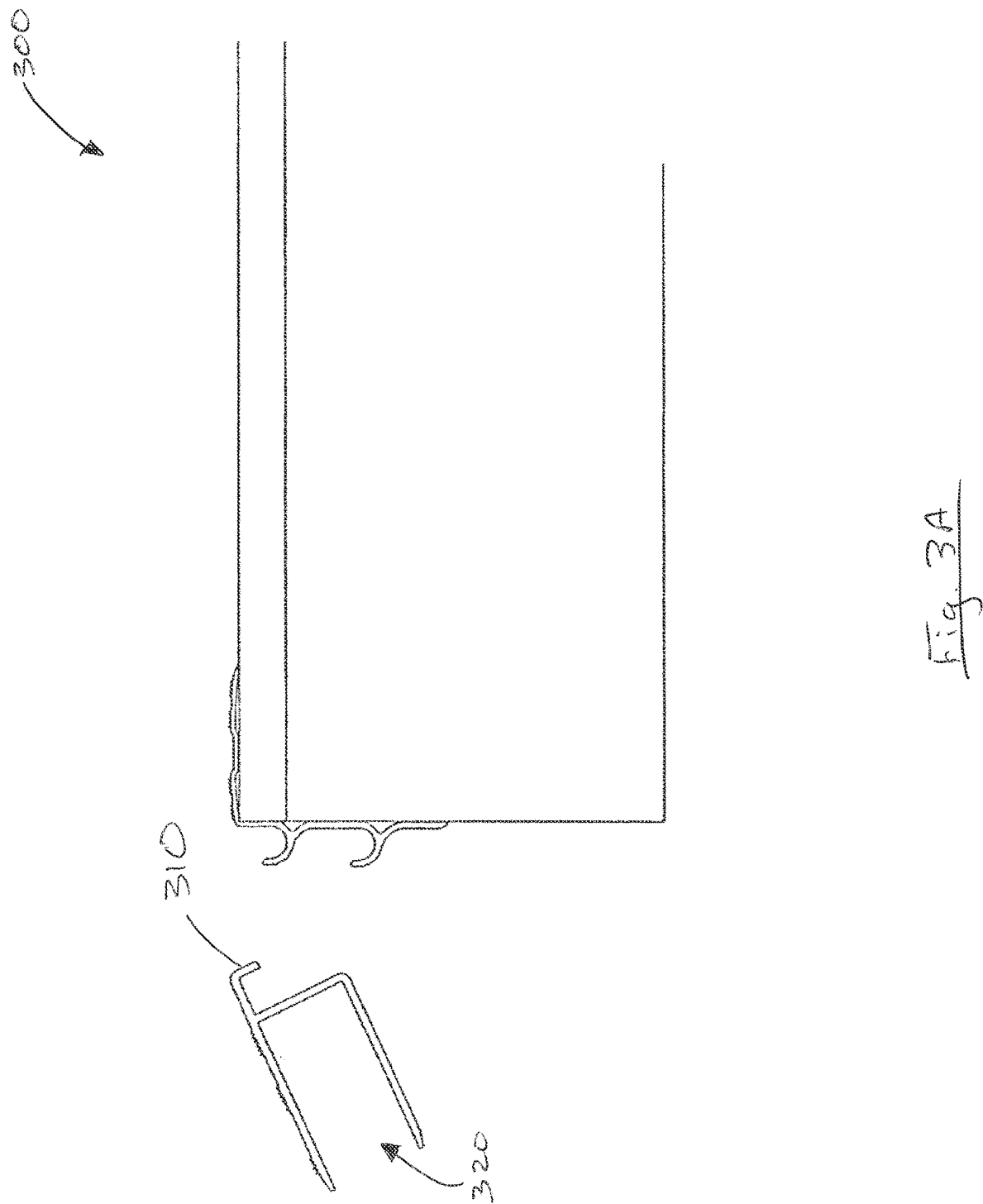

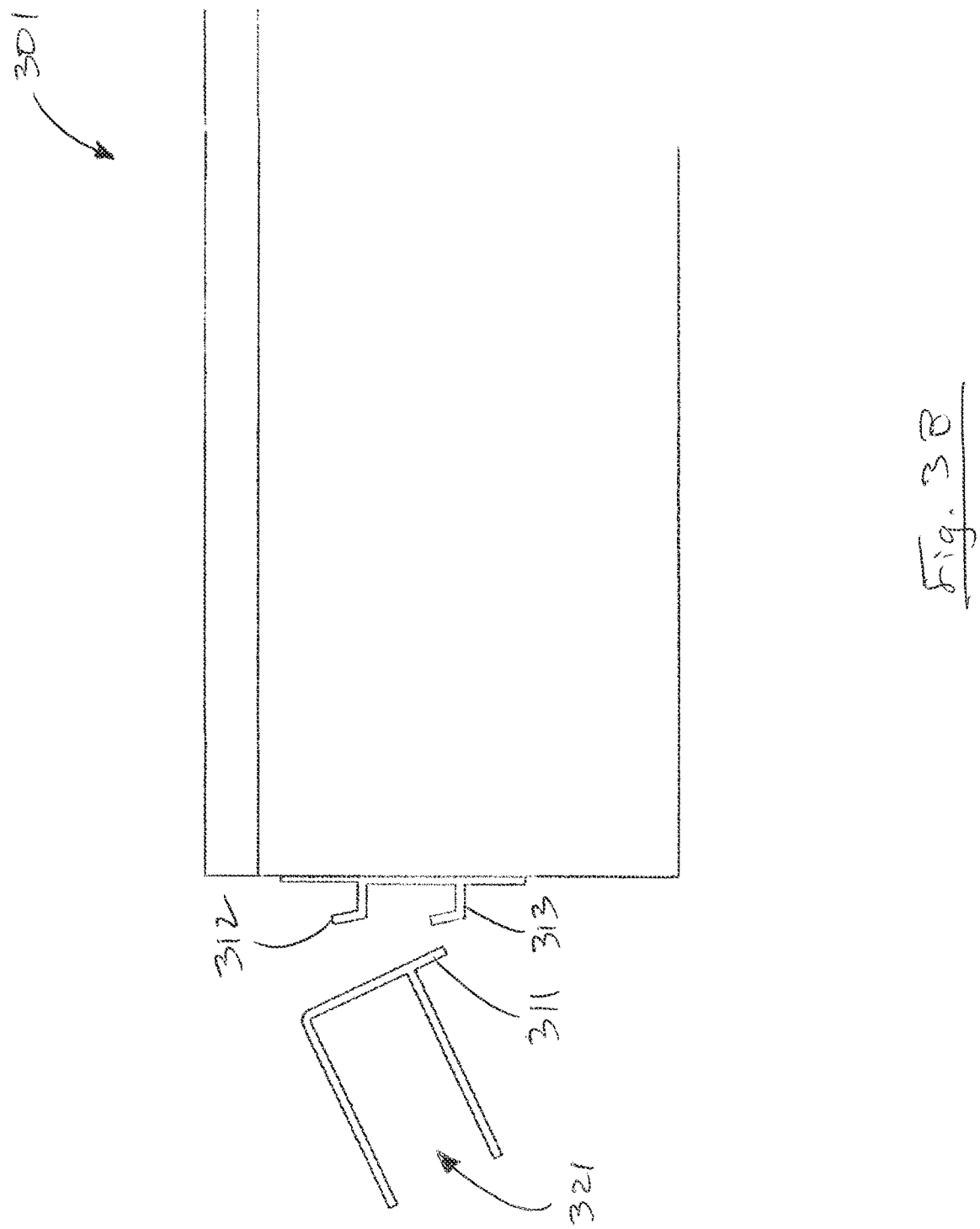

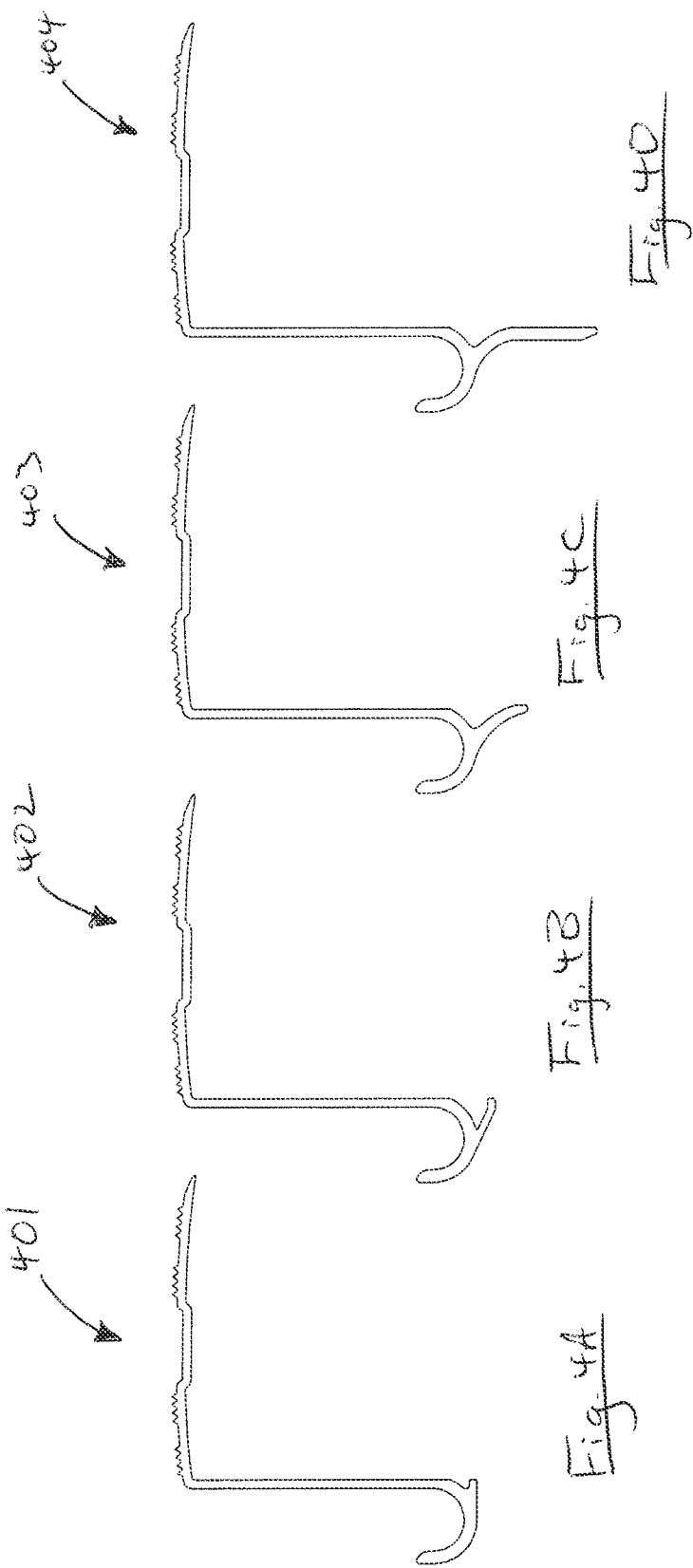

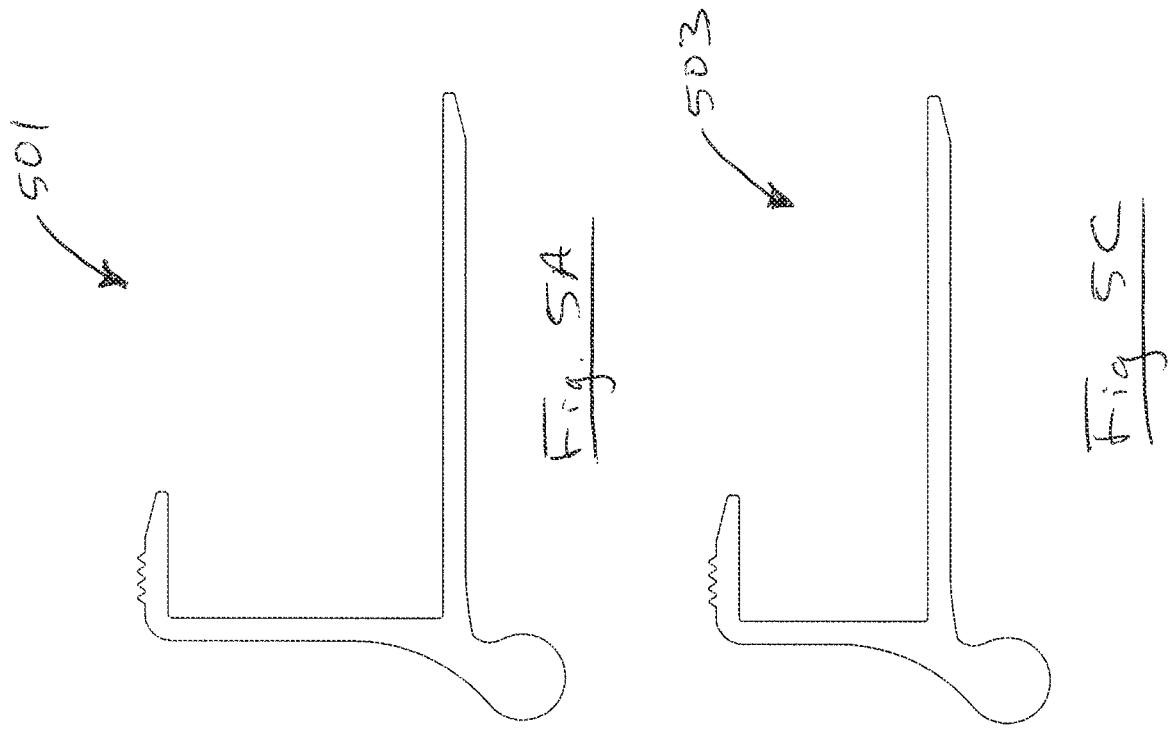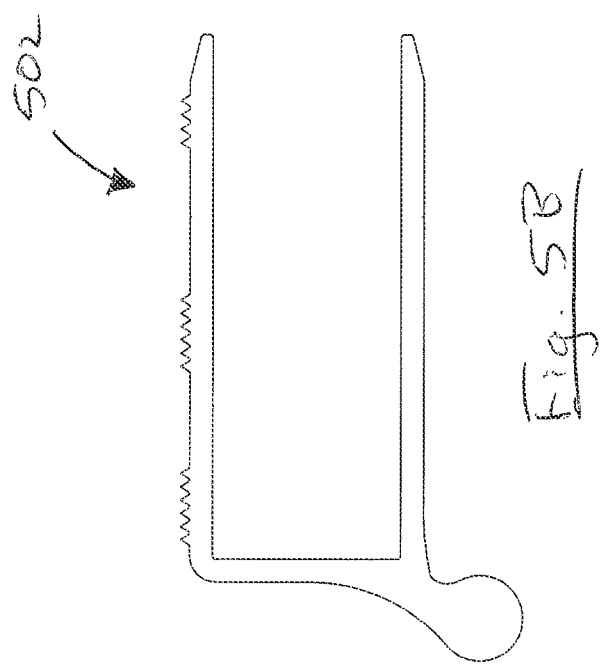

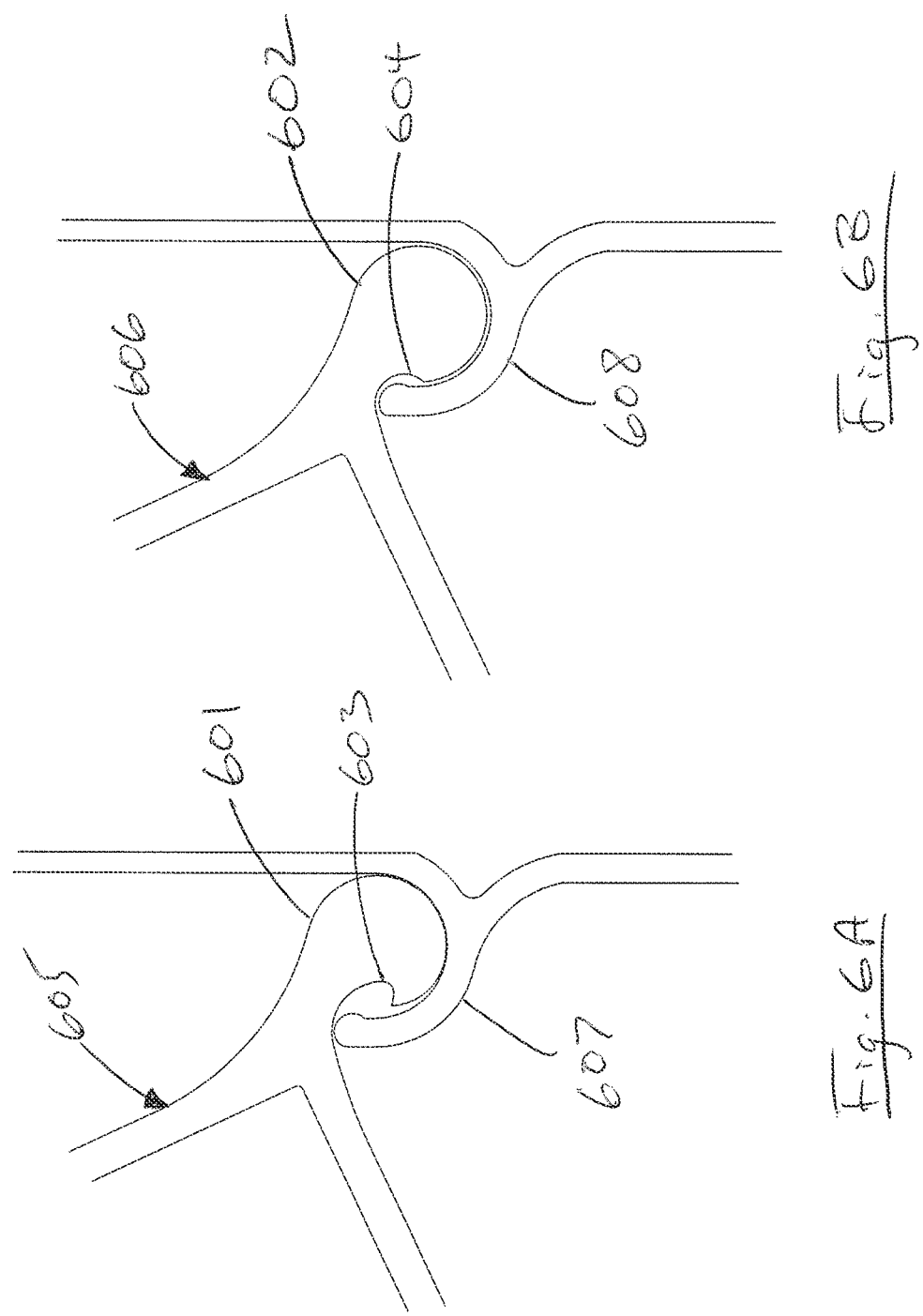

RAMP COMPONENT SYSTEM

CROSS-REFERENCE TO RELATED APPLICATIONS

This application is continuation application of U.S. patent application Ser. No. 16/549,796 by BUNKER II, entitled "RAMP COMPONENT SYSTEM," filed Aug. 23, 2019; which is a continuation of U.S. patent application Ser. No. 14/153,787 by BUNKER II, entitled "RAMP COMPONENT SYSTEM," filed Jan. 31, 2014, which claims priority to Provisional U.S. Patent Application No. 61/751,362 by BUNKER II, entitled "RAMP COMPONENT SYSTEM," filed Jan. 11, 2013. The entire disclosure of the aforementioned U.S. Patent Applications are hereby incorporated by reference, for all purposes, as if fully set forth herein.

BACKGROUND OF THE INVENTION

This invention relates generally to ramp systems. More specifically the invention relates to modular ramp systems for accessing buildings, storage containers, vehicles, and/or other structures.

BRIEF DESCRIPTION OF THE INVENTION

In one embodiment, a ramp system is provided. The ramp system may include a first component and a second component. The first component may include a horizontal portion, a vertical portion, and a first hook. The horizontal portion may be configured to be supported by a top portion of a lip of a structure, where the horizontal portion may have a width equivalent to a length of the lip which supports the horizontal portion. The vertical portion may be coupled with an edge of the horizontal portion and configured to hang downward from the horizontal portion along a side portion of the lip of the structure, where the vertical portion may have the same width as the horizontal portion. The first hook may be coupled with the vertical portion, where the first hook may have the same width as the horizontal portion. The second component may include a first protrusion and a first channel. The first protrusion may have a maximum width equal to or less than the width of the horizontal portion, where the first protrusion may be configured to be supported by the first hook. The first channel may be coupled with the first protrusion, where the first channel may have the same width as the first protrusion. The first channel may be configured to receive a first planar component which forms a sloped surface of a first ramp.

In another embodiment, a kit for providing a ramp is provided. The kit may include a first component and a second component. The first component may include a horizontal portion, a vertical portion, and a first hook. The horizontal portion may be configured to be supported by a top portion of a lip of a structure, where the horizontal portion may have a width equivalent to a length of the lip which supports the horizontal portion. The vertical portion may be coupled with an edge of the horizontal portion and configured to hang downward from the horizontal portion along a side portion of the lip of the structure, where the vertical portion may have the same width as the horizontal portion. The first hook may be coupled with the vertical portion, where the first hook may have the same width as the horizontal portion. The second component may include a first protrusion and a first channel. The first protrusion may have a maximum width equal to or less than the width of the horizontal portion, where the first protrusion may be configured to be supported by the first hook. The first channel may be coupled with the first protrusion, where the first channel may have the same width as the first protrusion. The first channel may be configured to receive a first planar component which forms a sloped surface of a first ramp.

In another embodiment, a method for providing a ramp to a lip of a structure is provided. The method may include coupling a first component to the lip of the structure. The first component may include a horizontal portion, a vertical portion, and a first hook. The horizontal portion may be configured to be supported by a top portion of a lip of a structure, where the horizontal portion may have a width equivalent to a length of the lip which supports the horizontal portion. The vertical portion may be coupled with an edge of the horizontal portion and configured to hang downward from the horizontal portion along a side portion of the lip of the structure, where the vertical portion may have the same width as the horizontal portion. The first hook may be coupled with the vertical portion, where the first hook may have the same width as the horizontal portion. The method may also include coupling a first planar component with a second component. The second component may include a first protrusion and a first channel. The first protrusion may have a maximum width equal to or less than the width of the horizontal portion, where the first protrusion may be configured to be supported by the first hook. The first channel may be coupled with the first protrusion, where the first channel may have the same width as the first protrusion. The first channel may be configured to receive a first planar component which forms a sloped surface of a first ramp. The method may further include depositing the first protrusion into the first hook.

BRIEF DESCRIPTION OF THE DRAWINGS

The present invention is described in conjunction with the appended figures:

FIG. 3A is a side view of another ramp system embodiment of the invention;

FIG. 3B is a side view of another ramp system embodiment of the invention;

FIGS. 4A-4D are side views of various first components as present in varying embodiments of the invention;

FIGS. 5A-5C are cross sections of various second components as present in varying embodiments of the invention;

FIGS. 6A-6B are cross sections of potential hooked portions of the protrusions of second components present in some embodiments of the invention;

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims. For example, any detail in one embodiment may not be included in other versions of that embodiment, or may be added to any other embodiment or modified version of the other embodiment.

Specific details are given in the following description to provide a thorough understanding of the embodiments. However, it will be understood by one of ordinary skill in the art that the embodiments may be practiced without these specific details. For example, systems, processes, and other elements in the invention may be shown as components in block diagram form in order not to obscure the embodiments in unnecessary detail. In other instances, well-known processes, structures, and techniques may be shown without unnecessary detail in order to avoid obscuring the embodiments.

Figure 1:
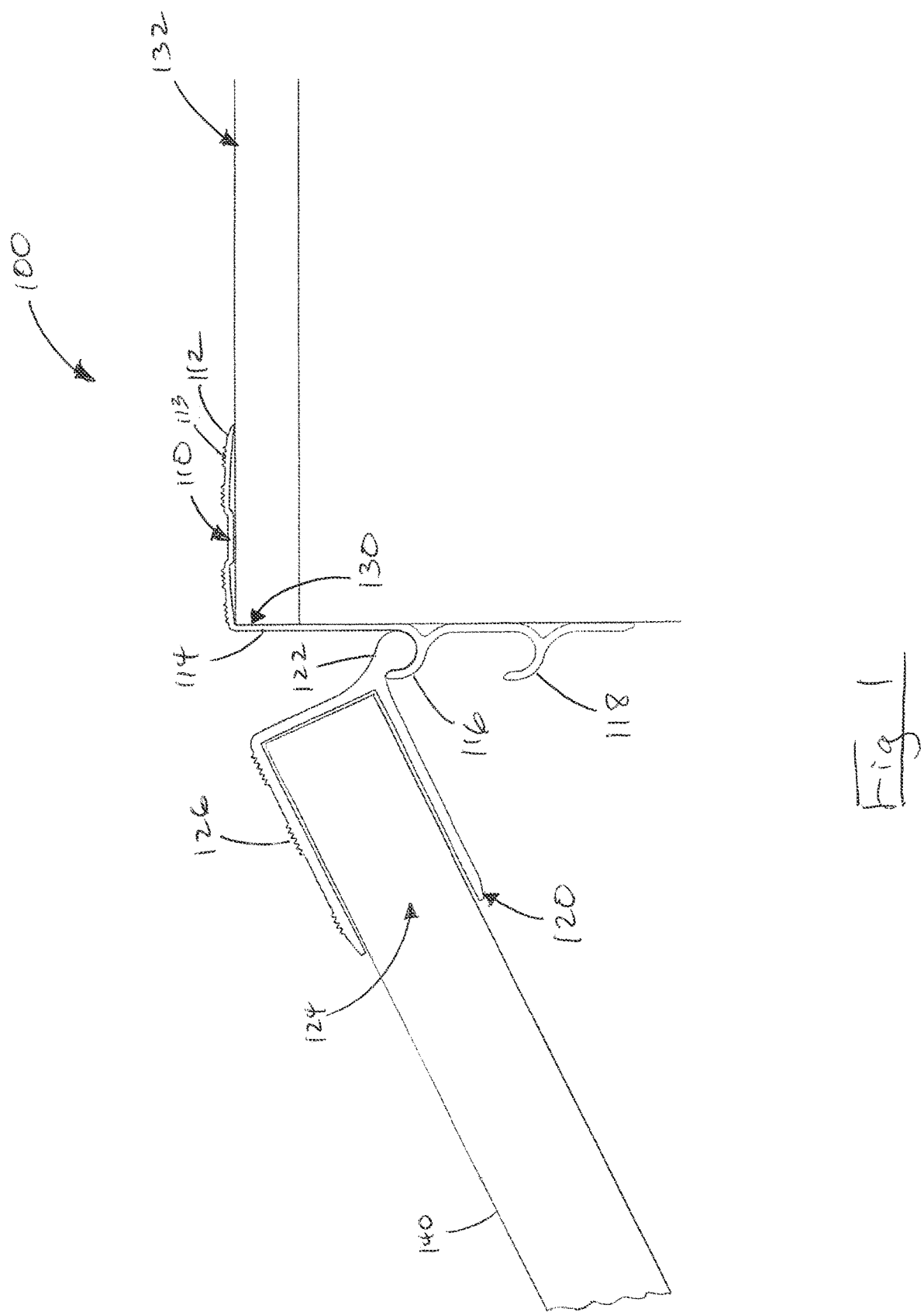
FIG. 1 is a side view of a ramp system embodiment of the invention.

Embodiments discussed herein allow for a ramp or ramps to be affixed to a shed, storage container, building, vehicle (i.e., truck beds, trailers, recreational vehicles, etc.), towable storage, or other device/structure (hereinafter, collectively, "structure"). Systems, kits, and methods are provided by various embodiments of the invention that will become apparent to those of skill in the art after reading the present disclosure. Turning now to FIG. 1, a ramp system 100 embodiment is shown. The ramp system may include a first component 110 and a second component 120.

First component 110 may include a horizontal portion 112, a vertical portion 114, and a first hook 116. Horizontal portion 112 may be configured to be supported by a top portion of a lip 130 of a structure 132. Horizontal portion 112 may have a width equivalent to a length of lip 130 which supports horizontal portion 112 (i.e., approximately the width of the doorway or less). In some embodiments, horizontal portion 112 may include anti-slip features 113. In some embodiments horizontal portion 112 may consist of, or constitute, sill nosing. First component 110 may couple with lip 130 in any number of possible ways, including fasteners (i.e., screws, nails, etc.), adhesives (i.e., glue), and/or ribs which bite into lip 130. Such coupling mechanisms may be employed anywhere along the interface of first component 110 with lip 130.

Vertical portion 114 may be coupled with an edge of horizontal portion 112 and may be configured to hang downward from horizontal portion 112 along a side portion of lip 130 of structure 132. Vertical portion 114 may have the same width as horizontal portion. 112 (i.e., approximately the width of the doorway or less). First hook 116 may be coupled with vertical portion 114, and may have the same width as the horizontal portion 112 (i.e., approximately the width of the doorway or less). In some embodiments, first hook 116 may have a width less than that of the horizontal portion 112.

Second component 120 may include a first protrusion 122 and a first channel 124. First protrusion 122 may have a maximum width equal to or less than the width of the horizontal portion 112 (i.e., approximately the width of the doorway or less). First protrusion 122 may be configured to be supported by first hook 116. This allows for the ramp, depending on the length of the ramp, the range of motion permitted by the knuckle/hook, as well as surrounding terrain, to extend away from the structure at variable angle. This can allow for the ramp angle to vary as the building and ramp settle into the supporting surface (i.e. the ground) at a different rate.

First channel 124 may be coupled with first protrusion 122, where first channel 124 may have the same width as first protrusion 122 (i.e., equal to or less than the width of the horizontal portion 112 (i.e., approximately the width of the doorway or less)). First channel 124 may be configured to receive a first planar component 140 which forms a sloped surface of a first ramp. In some embodiments, the top exterior of first channel 124 may include anti-slip features 126. Second component 120 may couple with lip first planar component 140 in any number of possible ways, including fasteners (i.e., screws, nails, etc.), adhesives (i.e., glue), and/or ribs which bite into first planar component 140. Such coupling mechanisms may be employed anywhere along the interface of second component 120 with first planar component 140.

Figure 2:
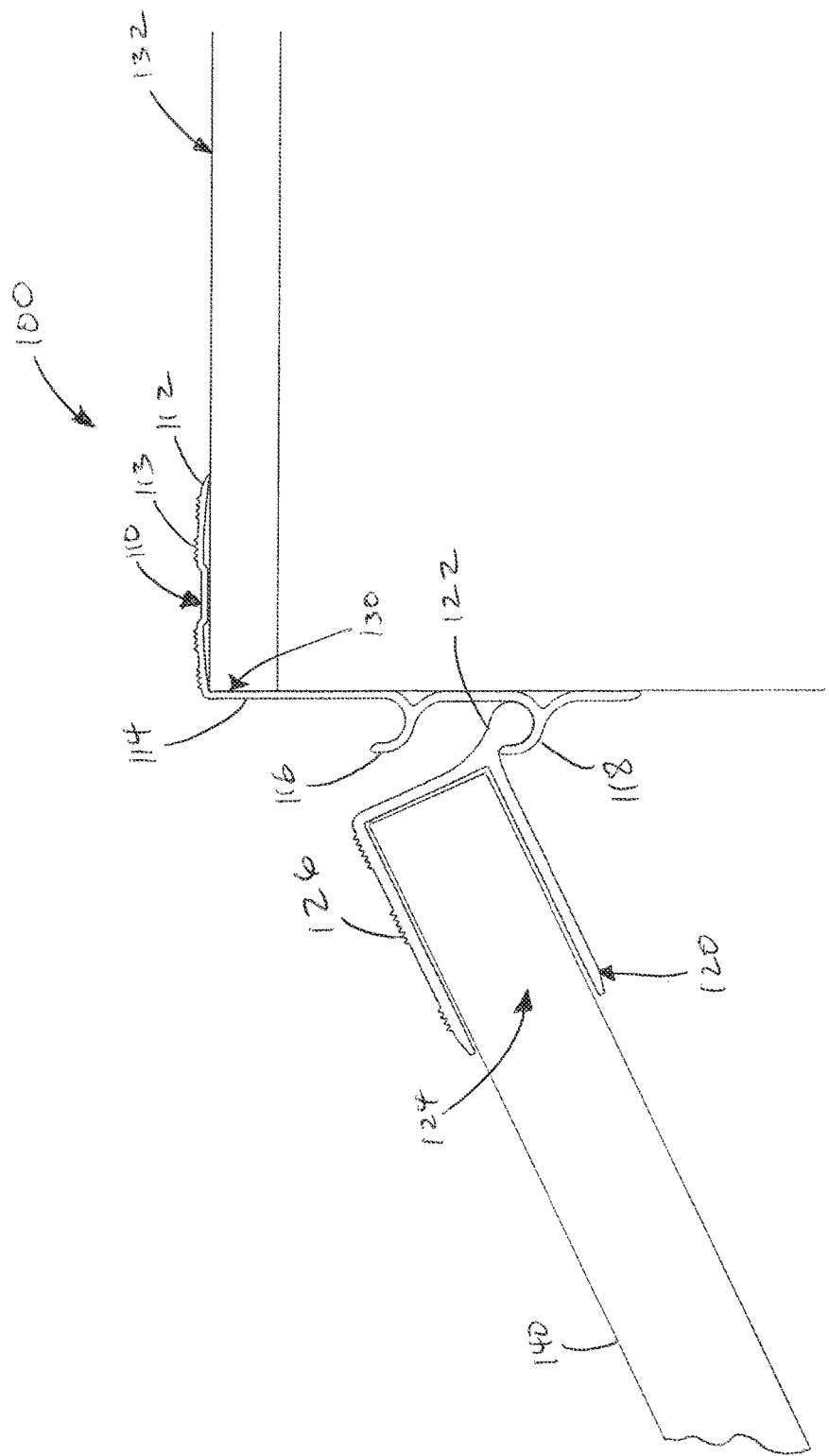
FIG. 2 is a side view of the ramp system of FIG. 1 in a different configuration.

In some embodiments, a second hook 118 maybe coupled with vertical portion 114, wherein second hook 118 may have the same width as horizontal portion 110, and is also configured to support first protrusion 122. FIG. 2 shows second hook 118 supporting first protrusion 122. In some embodiments, second hook 118 may have a width less than that of the horizontal portion 112.

While in FIGS. 1 and 2 hooks 116, 118 are shown as being round, and first protrusion 122 is also round and at least partially congruent with hooks 116, 118, other shapes for hooks 116, 188 and first protrusion 122 are also possible. FIG. 3A and FIG. 3B show other potential configurations. System 300 shows an angled protrusion 310, while system 301 shows a straight protrusion 311 and angled hooks 312, 313. Also note that (a) protrusion 310 is located at the opposite corner of channel 320 than channels 124, 321, and that (b) the first component may not have a horizontal portion, instead coupling directly to the side of the lip, as shown in FIG. 3B. In these or other embodiments, the second component may also not include a channel, but instead couple to one side or edge of the planar component. For example, the second component may couple to the bottom of the planar component, the end/edge of the planar component, and/or the top of planar component. These variations may be possible in any embodiment discussed herein.

FIGS. 4A-4D show variations 401, 402, 403, 404 of first component 110 which include only a first hook 116, and not a second hook 118. In yet other embodiments, a first component may have three or more hooks to allow the ramp to be provided at a number of possible elevations.

FIGS. 5A-5C show variations 501, 502, 503 of second component 120 which have differing channel widths (501 versus 503), and/or different lengths of channel walls (501, 503 versus 502).

FIGS. 6A-6B show protrusions 601, 602 which have a hooked portion 603, 604 which assist in resisting movement of second component 605, 606 from hook 607, 608. This detail may be present in various embodiments of the invention to assist in preventing accidental or unintentional removal of the ramp from the structure. If second component 605, 606 is rotated too far downward, or pulled away from hook 607, 608, hooked portion 603, 604 may engage the tip of hook 607, 608, thereby discouraging disengagement of the ramp. Hooks 607, 608 may also have bulbous ends, as shown, to at least partially assist in preventing removal of the ramp from the structure.

Figure 7:
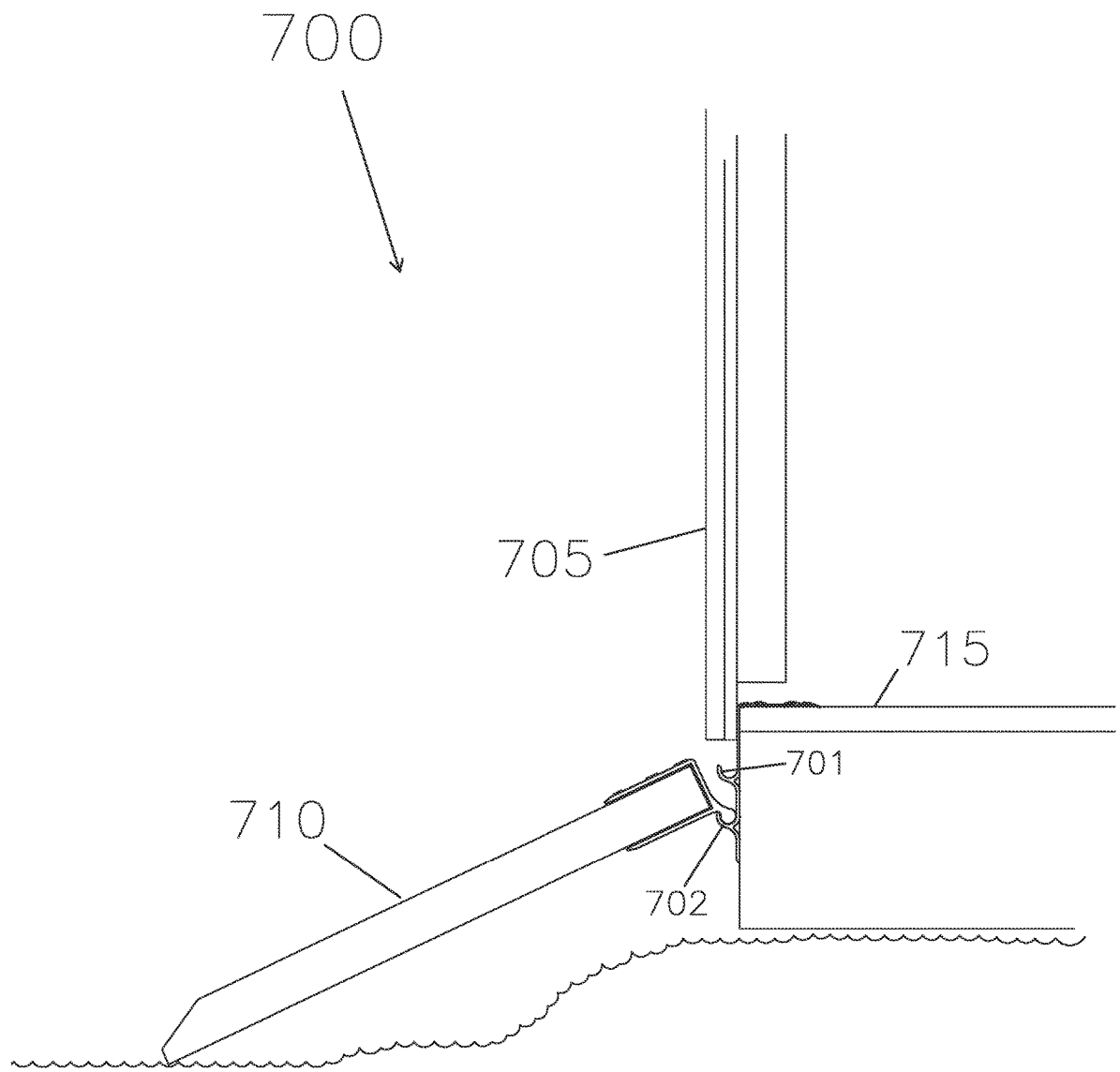
FIG. 7 is a side view of an embodiment of the invention as attached to a structure for providing access thereto.

FIG. 7 shows one example 700 of why multiple hooks 701, 702 may be present in some embodiments. When door 705 is closed, having ramp 710 engaged in hook 701 may not be possible because of the overhang of door 705. When door 705 is to be opened or closed, ramp 710 may therefore be engaged in hook 702. While door 705 is open, and access to the structure desired, ramp 710 may be engaged in hook 701 to bring the top of ramp 710 in closer proximity to the level of floor 715. Thus, hook 701 provides for easy access to the structure, while hook 702 provides for storage of the ramp in the meantime, as well as ramped access when height of the ramp compared to the level of floor 715 is not critical (i.e., when a dolly or other loading device is not being employed).

Figure 8A:
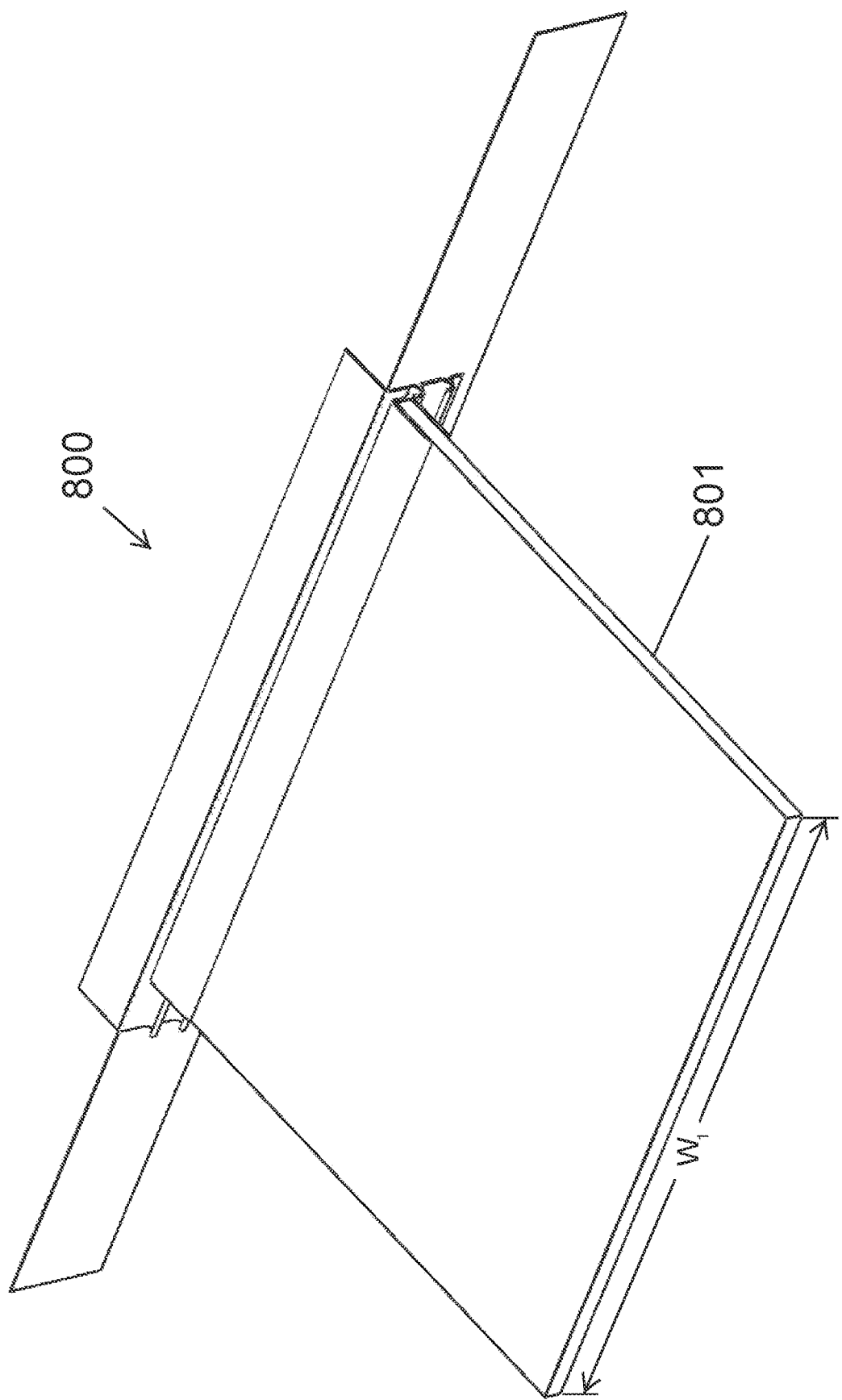
FIG. 8A is a perspective view of an embodiment of the invention where a single ramp is present.
Figure 8B:
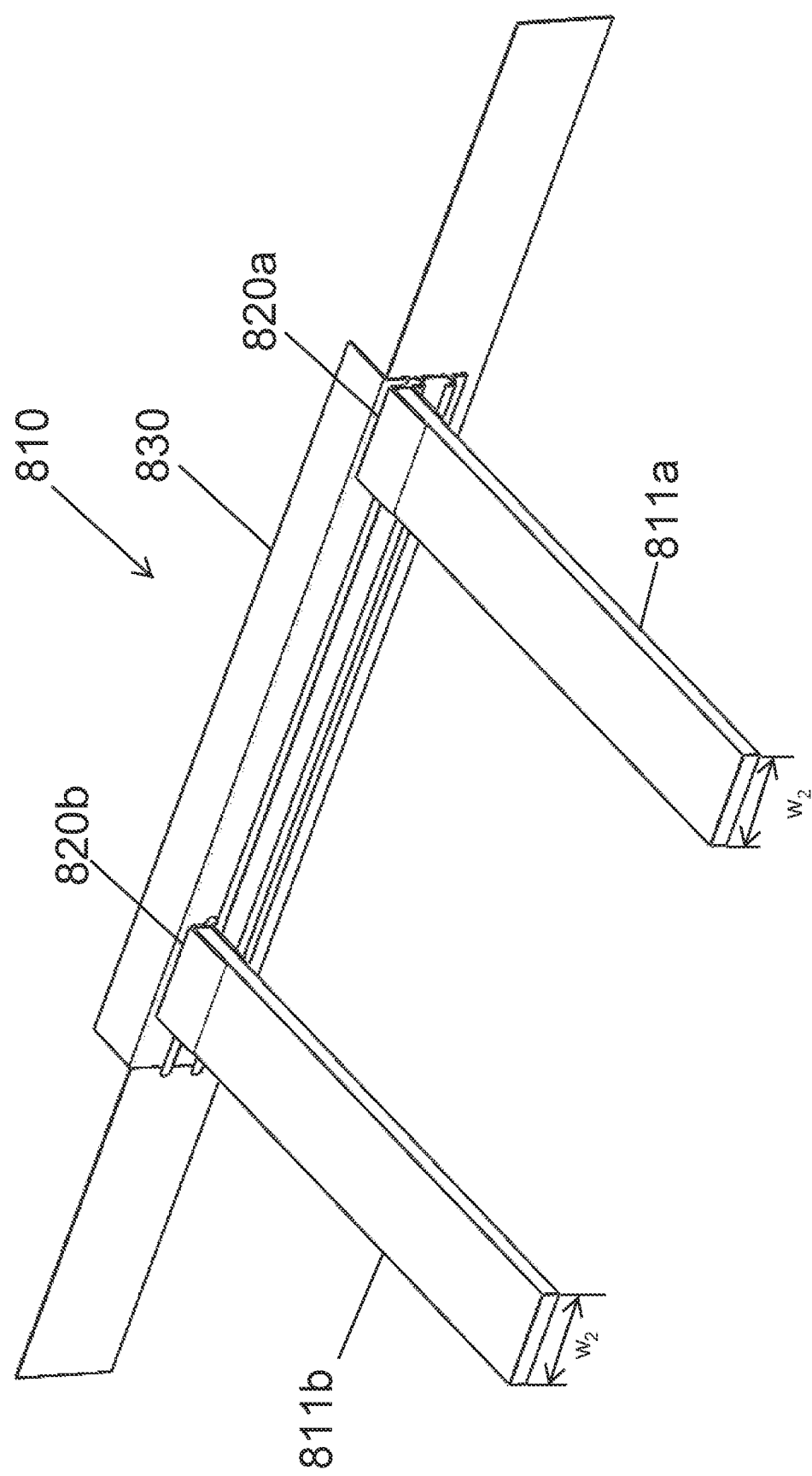
FIG. 8B is a perspective view of an embodiment of the invention where two ramps are present.

FIG. 8A shows one embodiment 800 where a single ramp 801 is employed. In this embodiment, single ramp 801 provides access to the structure. The width ('$W_1$') of single ramp 801 may be approximately equal to or less than the width of a corresponding door or other egress from the structure. FIG. 8B shows an alternative embodiment 810 where two ramps 811 are employed. In this embodiment, the width ('$W_2$') of each ramp 811 may be less than the width of a corresponding door or other egress from the structure. Additionally, two second components 820 may be necessary in this embodiment (one for each ramp 811), but only one first component 830 may be used. In other embodiments, multiple separate smaller first components 830 may be used, one at each ramp connection. Embodiments similar to 810 may allow a means of providing vehicle ramps, where wheels may roll up-and-down ramps 811.

The invention has now been described in detail for the purposes of clarity and understanding. However, it will be appreciated that certain changes and modifications may be practiced within the scope of the appended claims.

What is claimed is:

1. A ramp component, comprising:
one or more ramp planks, each of the one or more ramp planks comprising an upper end and a lower end, and each of the one or more ramp planks comprises an upper surface and a lower surface that extend between the upper end and the lower end, wherein:
the upper end of each of the one or more ramp planks is configured to couple with an opening to a structure;
the lower end of each of the one or more ramp planks is configured to rest upon a ground structure; and
a length of each of the one or more ramp planks matches a length of a resultant ramp formed by the one or more ramp planks; and
a protrusion that extends from the upper end at a downward angle relative to the upper surface of the one or more ramp planks, wherein:
a distal end of the protrusion comprises a bulbous end or a linear member that comprises two parallel sides that are coupled by an end surface, the linear member having a length that is greater than a thickness of the linear member; and
the protrusion is configured to be pivotable relative to an engagement member of a structure to enable an angle of the one or more ramp planks to be varied when the protrusion is coupled with the engagement member of the structure.

2. The ramp component of claim 1, wherein:
the protrusion extends from a first corner formed between the upper surface and the upper end or a second corner formed between the lower surface and the upper end.

3. The ramp component of claim 1, wherein:
the protrusion extends in a direction that is at least substantially orthogonal to the upper surface.

4. The ramp component of claim 1, further comprising:
a channel member that extends between and couples the one or more ramp planks and the protrusion.

5. The ramp component of claim 1, wherein:
the protrusion comprises a straight member that extends vertically or at a downward angle from the one or more ramp planks.

6. The ramp component of claim 1, wherein:
the protrusion comprises a bulbous end.

7. The ramp component of claim 1, wherein:
the protrusion comprises at least one hooked portion.

8. A ramp component, comprising:
a sill nosing that is configured to be coupled with a bottom surface of a door opening, the sill nosing comprising:
a horizontal member that is configured to be seated atop a lower horizontal surface of the door opening; and
a vertical member extending downward from the horizontal member at a substantially orthogonal angle, the vertical member being configured to be positioned against a lateral surface below the door opening, the vertical member comprising an upward-facing hook feature that extends along at least part of a width of the sill nosing, wherein:
the upward-facing hook feature and a lateral surface of the vertical member define a channel that has an open top;
a vertical distance from a top of the upward-facing hook feature and a top surface of the horizontal member is greater than an opening width of the upward-facing hook feature; and
the horizontal member terminates at a junction with the vertical member such that the upward-facing hook feature extends laterally beyond distal end of the horizontal member and such that the open top of the channel remains uncovered by the horizontal member.

9. The ramp component of claim 8, wherein:
the vertical member further comprises an additional hook feature that is positioned below the upward-facing hook feature.

10. The ramp component of claim 8, wherein:
the upward-facing hook feature further comprises a reinforcement member that extends downward from a base of the upward-facing hook feature.

11. The ramp component of claim 8, wherein:
an upper surface of the sill nosing comprises one or more anti-slip features.

12. The ramp component of claim 8, wherein:
the horizontal member of the sill nosing comprises:
a proximal portion that is positioned proximate the vertical member;
a distal portion; and
a medial portion that extends between the proximal portion and the distal portion; and
a top surface of the medial portion is lower than a top surface of the proximal portion.

13. The ramp component of claim 12, wherein:
the top surface of the medial portion is lower than a top surface of the distal portion such that the medial portion forms a channel between the proximal portion and the distal portion, the channel extending along at least a portion of the width of the door opening.

14. The ramp component of claim 8, wherein:
an upper surface of the sill nosing is configured to be generally horizontal relative to the bottom surface of the door opening.

15. A ramp component, comprising:
a horizontal member that comprises an uppermost surface that, when coupled with a door opening, provides clearance for a door to open and close and that forms a sill nosing of the door opening, wherein the horizontal member is configured to be seated atop a lower horizontal surface of the door opening; and
a vertical member extending downward from an edge of the horizontal member at a substantially orthogonal angle, the vertical member being configured to be positioned against a lateral surface below the door opening, the vertical member comprising an upward-facing hook feature that extends along at least part of a width of the ramp component, wherein a vertical distance from a top of the upward-facing hook feature and a top surface of the horizontal member is greater than an opening width of the upward-facing hook feature.

16. The ramp component of claim 15, wherein:
the upward-facing hook feature and a lateral surface of the vertical member define a channel that has an open top.

17. The ramp component of claim 16, wherein:
the horizontal member terminates at a junction with the vertical member such that the upward-facing hook feature extends beyond distal end of the horizontal member and such that the open top of the channel remains uncovered by the horizontal member.

18. The ramp component of claim 15, wherein:
the vertical member extends upward to a height that is at least equal to a height of a distalmost end of the upward-facing hook feature.

19. The ramp component of claim 15, wherein:
the upward-facing hook feature comprises a horizontal section and a vertical section that is coupled with an end of the horizontal section.

20. A ramp system, comprising:
a first ramp component comprising:
one or more ramp planks, each of the one or more ramp planks comprising an upper end and a lower end, and each of the one or more ramp planks comprises an upper surface and a lower surface that extend between the upper end and the lower end; and
a protrusion that extends from the upper end at a downward angle relative to the upper surface of the one or more ramp planks; and
a second ramp component comprising:
a sill nosing that is configured to be coupled with a bottom surface of a door opening, the sill nosing comprising:
a horizontal member that is configured to be seated atop the bottom surface of the door opening; and
a vertical member extending downward from the horizontal member, the vertical member comprising an upward-facing hook feature that extends along at least part of a width of the sill nosing, wherein:
the upward-facing hook feature and a lateral surface of the vertical member define a channel that has an open top;
the horizontal member terminates at a junction with the vertical member such that the upward-facing hook feature extends laterally beyond distal end of the horizontal member and such that the open top of the channel remains uncovered by the horizontal member; and
the protrusion is configured to engage with the channel to rotatably couple the first ramp component and the second ramp component such that an angle of the one or more ramp planks is adjustable relative to the sill nosing when the protrusion is engaged with the channel.

* * * * *